United States Patent [19]
Van Dyke et al.

[11] 4,069,551
[45] Jan. 24, 1978

[54] CATFISH SKINNER

[76] Inventors: Richard L. Van Dyke, R.R. 7; Michal A. Cunningham, 2108 N. 9th St., both of Springfield, Ill. 62707

[21] Appl. No.: 656,857

[22] Filed: Feb. 10, 1976

[51] Int. Cl.[2] .............................................. A22C 25/00
[52] U.S. Cl. ............................................ 17/68; 17/69
[58] Field of Search ................. 17/68, 66, 69; 81/300, 81/418, 428

[56] References Cited
U.S. PATENT DOCUMENTS

| | | | |
|---|---|---|---|
| 2,030,463 | 2/1936 | Nelms | 17/68 |
| 2,810,154 | 1/1965 | Wiesenhofer | 17/68 |
| 3,163,885 | 1/1965 | Dumas et al. | 17/68 |
| 3,353,207 | 11/1967 | Weinberger | 17/69 |

Primary Examiner—Louis G. Mancene
Assistant Examiner—Robert F. Cutting
Attorney, Agent, or Firm—Ralph F. Staubly

[57] ABSTRACT

A skinner tool especially effective for skinning catfish, but also effective for skinning other fish and animals, comprising: a pliers-like implement having a lower relatively flat jaw terminating in a relatively sharp front penetrating edge, and a curved upper jaw terminating in a blunt edge for gripping skin against the upper surface of the lower jaw adjacent its tip. The handle members are thickly dip-coated with a tough and preferably somewhat resilient plastic material and are shaped to provide more comfortable gripping. The lower handle member is curved to partly embrace the hand of the user as an aid to the pulling action. The gripping edge of the upper jaw may be flat, roughened or serrated.

8 Claims, 4 Drawing Figures

U.S. Patent        Jan. 24, 1978        4,069,551
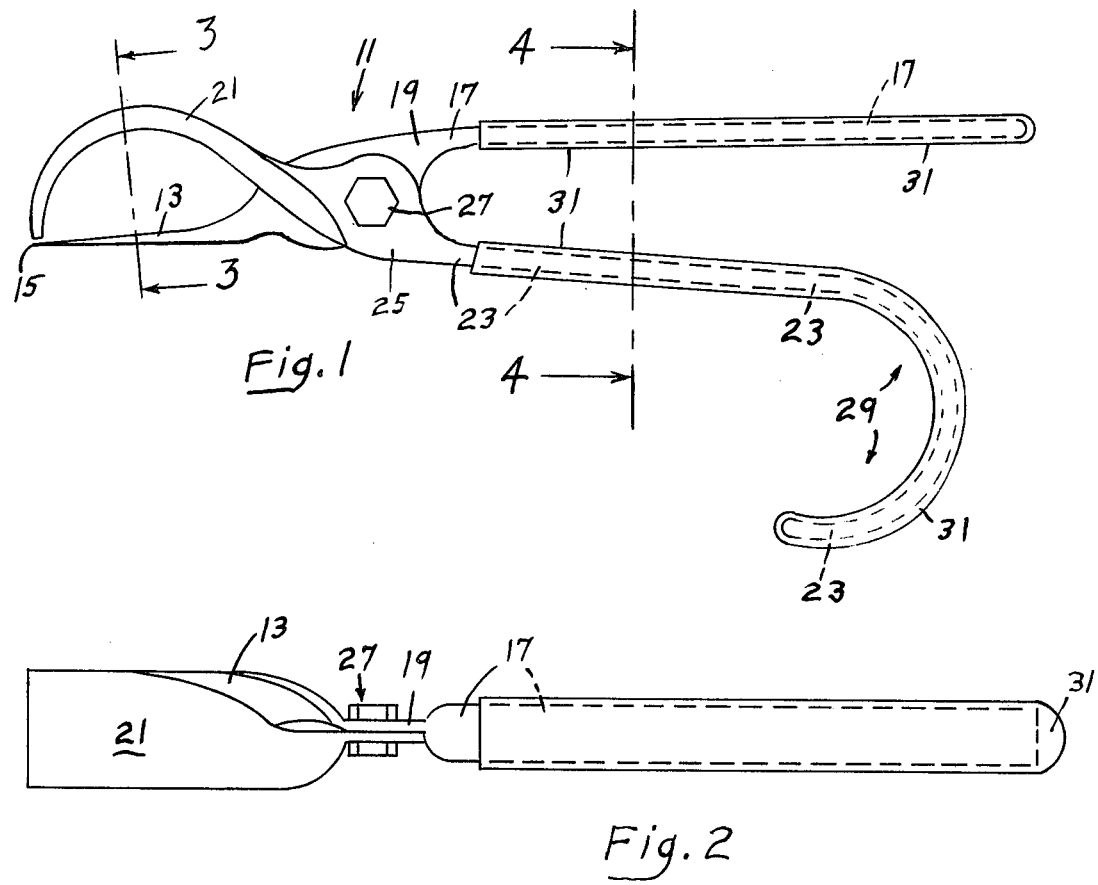
Fig. 1
Fig. 2
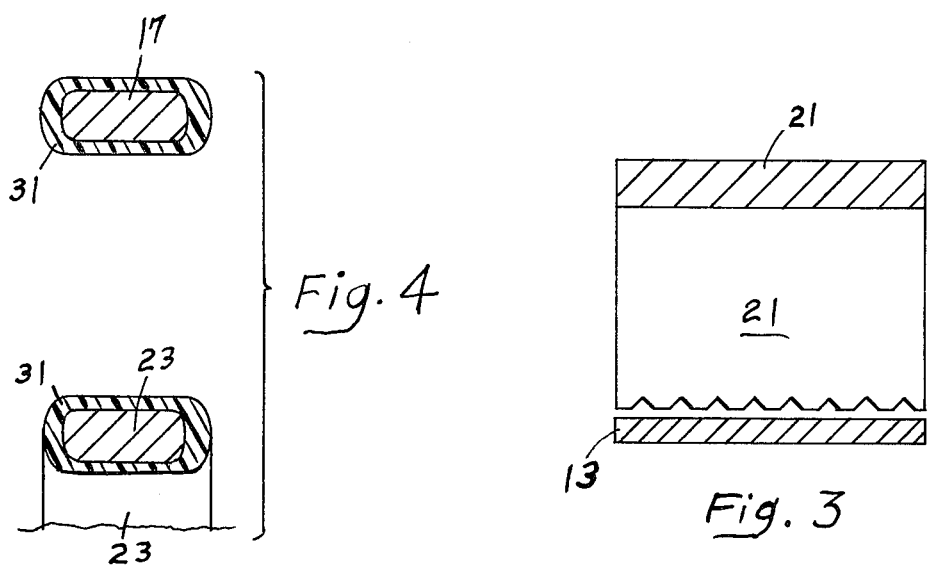
Fig. 4
Fig. 3

CATFISH SKINNER

OBJECTS OF THE INVENTION

It is the principal object of this invention to provide a tool that is especially effective for skinning catfish.

It is another object to provide such a tool which is easy to use and comfortable in use.

It is a further object to provide such a tool which is resistant to stains and corrosion, is long-lived and is economical to manufacture.

Other objects and advantages will appear as the following description proceeds.

BRIEF DESCRIPTION OF THE DRAWING

FIG. 1 is a side view of a preferred embodiment of the invention.

FIG. 2 is a plan view of the tool of FIG. 1.

FIG. 3 is an enlarged elevational view in section taken on the line 3—3 of FIG. 1.

FIG. 4 is an enlarged elevational view in section taken on the line 4—4 of FIG. 1.

DETAILED DESCRIPTION OF THE INVENTION

With reference now to FIGS. 1 and 2 of the drawing, the numeral 11 generally designates the skinner tool. The tool 11 comprises a flat tapered lower jaw member 13 having a relatively sharp front cutting or penetrating edge 15, and a rearwardly extending handle member 17 integrally connected to the jaw member 13 by a flattened portion 19. The tool 11 has an upper arch-shaped jaw member 21 integrally connected to its handle member 23 by a flattened portion 25. The flattened portions 23 and 25 are connected by a double-headed pivot pin 27 for pliers-like relative movements. The lower handle member 23 at its rear end 29 curves downwardly and forwardly to underlie the little finger and ring finger of the user to aid in exerting a skin-pulling action and to increase handling comfort.

Comfort in handling is further increased, first, by the widened cross-sectional shapes of the handle members 17 and 23 as shown in FIG. 4, and, secondly, by their being enlarged by their thickly dip-coated plastic jackets 31. The plastic material of the jackets 31 should be durably tough, and desirably somewhat resilient for comfortable gripping. The dull edge of the upper jaw can be smooth, roughened, or serrated as shown in FIG. 3.

METHOD OF USE OF THE CATFISH SKINNER

In skinning a catfish, the skin is first cut across the back below the head. Next the sharp edge of the open tool is inserted rearwardly under the skin at the cut. Then the jaws are tightly closed and the tool is pulled down toward the tail, stripping off the back skin. A similar operation is performed for the ventral skin.

Having thus described our invention, we claim:

1. A skinning tool comprising: a lower relatively flat jaw member having a rearwardly extending upper handle member integrally connected thereto, an upwardly arched upper jaw member having a rearwardly extending lower handle member integrally connected thereto, a horizontal pivot pin connecting said jaw members and handle members at their crossed integrally connecting portions for pliers-like relative movements, said lower jaw member having a relatively sharp penetrating front edge and said upper jaw member having a downwardly facing blunt front edge for gripping skin between itself and the top surface of said lower jaw member adjacent its front edge, said blunt front edge of said upper jaw member having notches therein defining spaced flat skin-gripping areas on its face.

2. Structure according to claim 1, said members being formed of forged steel.

3. Structure according to claim 2, said steel members being plated with corrosion- and stain-resistant metal.

4. Structure according to claim 1, said handle members being wider than thick for more comfortable gripping.

5. Structure according to claim 4, said handle members being dip-coated by a plastic material that is at least slightly resilient.

6. Structure according to claim 1, said handle members being dip-coated by a plastic material that is at least slightly resilient.

7. Structure according to claim 1, said blunt front edge of said upper jaw member having a roughened surface for increasing its skin-gripping effect.

8. Structure according to claim 1, said lower handle member terminating rearwardly in a downwardly and forwardly curved portion for skin-pulling engagement by the hand of a user.

* * * * *